July 18, 1944. M. K. GREY 2,354,008
BEVERAGE BREWING APPARATUS
Filed June 12, 1942
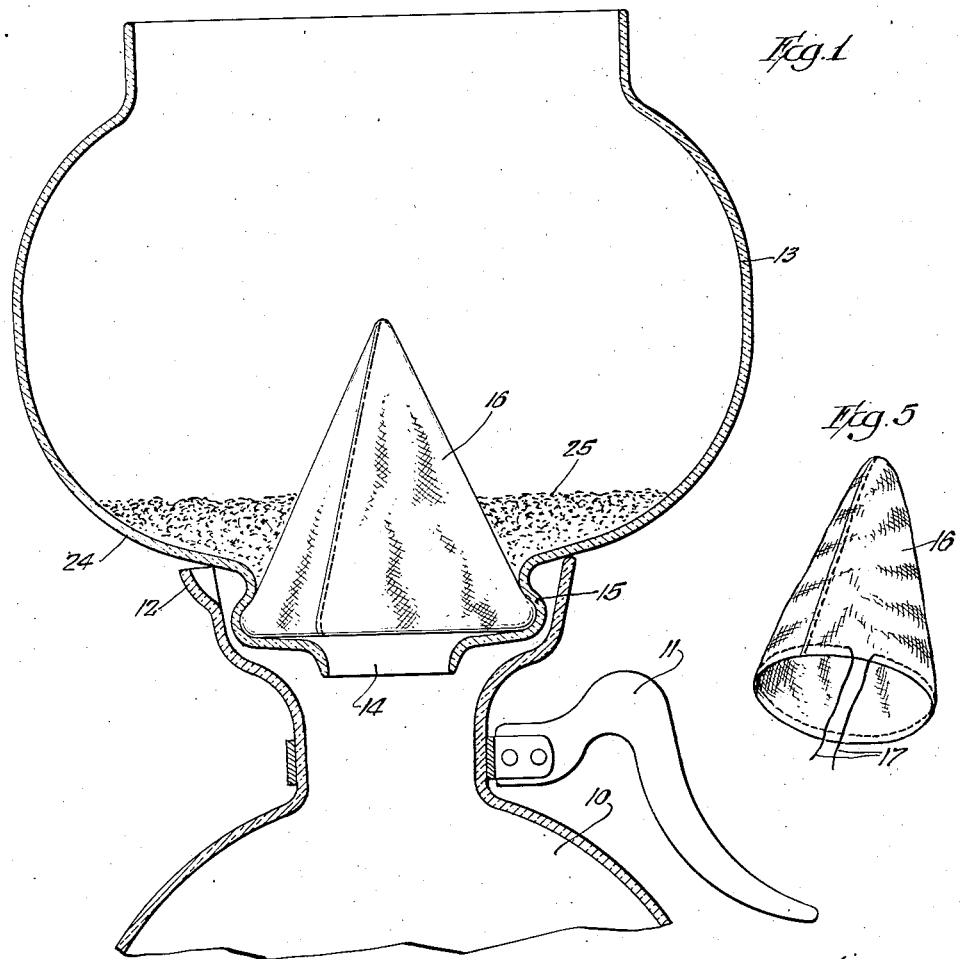
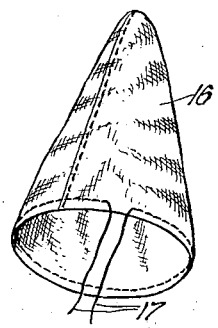
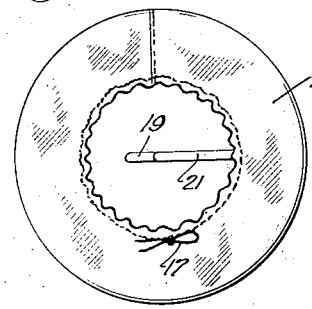
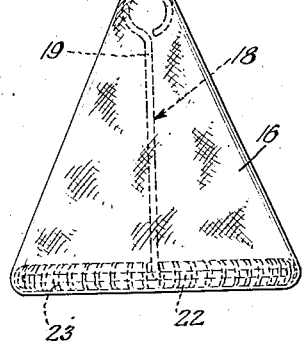
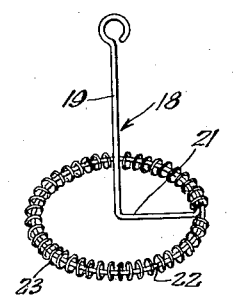
Inventor
Milton K. Grey
BY:—
Sheridan, Davis & Cargill
Attys.

Patented July 18, 1944

2,354,008

UNITED STATES PATENT OFFICE 2,354,008

BEVERAGE BREWING APPARATUS

Milton K. Grey, Chicago, Ill., assignor to Hill-Shaw Company, Chicago, Ill., a corporation of Illinois Application June 12, 1942, Serial No. 446,687

1 Claim. (Cl. 210—162)

This invention relates to improvements in beverage brewing apparatus.

In coffee brewing apparatus of the vacuum type, filters generally are provided in the lower part of the upper bowls. The coffee grounds accumulate upon and around the filter during the return of the liquid to the lower bowl and become compacted on the filter and impede the flow of brew therethrough. The suction effect of the partial vacuum in the lower bowl, however, eventually draws all or most of the liquid from the upper bowl. With drip type bowls such suction is not present and while rather finely ground coffee is employed generally in such brewers, a coarse filtering medium, such as a strainer-like coffee holding compartment usually is provided to shorten the period required in completing the brewing operation. Such brew generally is not clear due to particles that pass through the strainers.

An object of the present invention is to provide filtering means adapted for use in a drip-type brewer that will produce a clear brew free of grounds and specks, but which permits the brew to flow without excessive obstruction by accumulated and compacted grounds.

Another object of the invention is to provide a filter having a filter element such as fabric which projects upwardly into the liquid to be brewed above the level of accumulated brew substance and is of a hollow geometrical form to provide a relatively large filtering area and which at its base engages the receptacle to prevent passage from the latter of particles of the brew substance.

An additional object of the invention is to provide an improved filter which not only is self-anchoring within a receptacle, but which is so shaped and adapted to be so positioned in a receptacle that the accumulated brew material, such as coffee grounds, for example, are not compacted in a dense mass over the entire filtering area of the cloth but are caused to settle annularly around the filter so as not unduly to impede or delay the filtering process.

Other objects of the invention relate to various features of construction and arrangement of parts which will be apparent from a consideration of the following specification and accompanying drawing wherein a structure illustrative of the invention is shown.

Figure 1 is a broken elevational view, partly in section, of brewing apparatus embodying the present invention;

Fig. 2 is a side elevation of a filter detached from the brewing apparatus;

Fig. 3 is a bottom plan view of the detached filter;

Fig. 4 is a perspective of the filter cloth holder or supporting frame member;

Fig. 5 is a perspective view of the filter cloth detached from the holder.

In the drawing, 10 indicates a lower bowl of a brewing apparatus having a handle 11 and preferably provided with a pouring lip 12. The bowl 10 is shown as of glass, but the material of which it or the upper bowl 13 is made is not pertinent to the invention. The upper bowl 13 has a lower portion arranged to seat freely within the upper end of the lower bowl during the brewing operation, no gasket being employed to provide an air tight seal as in conventional vacuum type brewing apparatus. The upper bowl has no funnel or tubular stem, as will be observed, such as are employed in vacuum type brewers since such funnel is not required in brewing by the drip method.

In the preferred form of the invention the upper bowl is provided within its outlet passage 14 with an annular channel convex in cross section constituting a filter seat 15. The filter medium preferably is of cloth, such as cotton, for example, and is in the form of a conical envelope having a closed apex and an open lower end, as illustrated in Fig. 5. The filter envelope is indicated by the numeral 16 and at its base is provided with means such as a drawstring 17 for attaching the envelope to a supporting frame or holder. A suitable holder or supporting frame 18 is illustrated in Fig. 4, the same comprising a vertical stem or standard 19 of wire having a ring or handle 20 at its upper end while the lower end is extended laterally at 21 and terminates in an annular resilient ring 22 surrounding which is a helical coil 23 of resilient wire. The maximum or outer diameter of the coil 23 is slightly greater than the internal diameter of the channel or filter seat 15 of the upper bowl.

The filter cloth 16 is of a size to receive the frame or holder 18, the upper end of the standard seating in the upper end or apex of the conical cloth, while the lower edge of the cloth is drawn inwardly toward the center of the base or ring 23 of the frame as illustrated in Fig. 3. The string, when tied, holds the cloth and holder in the assembled relation shown in Fig. 2. In lieu of a drawstring, other means may be employed for drawing the lower edge of the envelope inwardly of the ring 23.

The assembled filter can be inserted readily in position in the upper bowl as shown in Fig. 1. In so positioning the filter, it is merely pressed downwardly into the bottom of the bowl, causing the coil 23 first to contract and pass into the channel seat 15, whereupon it expands and holds the filter cloth in close contact with the channel walls. This construction prevents particles of coffee grounds, tea leaves or particles of the substance being brewed from passing between the cloth and the walls of the seat 15 into the lower bowl which receives the completed beverage and from which it may be served.

The holder 18 holds the cloth in a generally conical form and with sufficient tautness preferably to prevent collapse of the cloth walls under the pressure of the liquid in the upper bowl.

In using the improved apparatus for brewing coffee, for example, the ground coffee is placed in the upper bowl 13 after the filter has been positioned therein, as described. Hot water is then poured into the upper bowl and the brew passes or drips through the filter cloth, into and through the passage 14 into the lower bowl 10. It will be noted that the coffee grounds, as indicated at 25 in Fig. 1 do not settle directly upon the filter cloth but upon the base 24 of the bowl. The grounds, of course, do contact an annular portion of the cloth as illustrated in Fig. 1, the vertical extent of which portion depends on the quantity of ground coffee employed, but due to the relatively large area of such contacted portion (as compared with a horizontal cloth having an effective filtering area no or only slightly greater than the area of the upper portion of the passage 14, as is common in vacuum type brewers) the accumulated grounds are less compacted and hence do not so substantially obstruct the flow of the liquid through the same. It will be noted that the filter extends upwardly a substantial distance into the upper bowl, well above the level of the settled grounds, and hence there is less obstruction to the passage of the brew through the filter than would be the case were the grounds permitted to settle directly upon the filter. Fine particles of the coffee, some in dust form, do not immediately settle to the bottom of the bowl after the water is placed in the bowl or after stirring the contents of the bowl, but remain suspended in the liquid in the upper bowl, but those particles are adequately filtered out of the brew in the passage of the liquid through the filter into the lower bowl.

The improved filter can readily be inserted in its position in a receptacle and readily removed therefrom, and the envelope can readily be removed from the frame or holder when desired. The assembled filter is self-locking in position due to the resiliency of the coil 23 and hence where the water and coffee grounds are stirred during the brewing operation displacement of the filter from its proper position is avoided. While I have shown an embodiment of the invention for the purpose of illustration, it will be apparent that various changes may be made therein without departing from the spirit or principle of the invention.

I claim:

A filter comprising a frame having an annular contractile ring-shaped base, a vertical standard positioned co-axially of the base and provided with a radially extending integral portion rigidly securing the standard to the base and a conical filter cloth open at the base thereof enclosing the frame with the apex of the cloth resting on and supported by the upper end of the standard and the open lower edge provided with a draw string beneath the base retaining the cloth taughtly about the frame whereby the filter is self-supporting in a vessel having an annular concave filter seat for receiving the base in contracted condition.

MILTON K. GREY.